United States Patent
Ota

(10) Patent No.: US 7,660,000 B2
(45) Date of Patent: Feb. 9, 2010

(54) STABILIZING PRINT JOB MANAGER

(75) Inventor: Satoshi Ota, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 556 days.

(21) Appl. No.: 11/148,297

(22) Filed: Jun. 9, 2005

(65) Prior Publication Data

US 2005/0275863 A1 Dec. 15, 2005

(30) Foreign Application Priority Data

Jun. 15, 2004 (JP) ............................. 2004-177378
May 25, 2005 (JP) ............................. 2005-152515

(51) Int. Cl.
*G06K 15/00* (2006.01)
*G06F 3/12* (2006.01)
(52) U.S. Cl. ..................... 358/1.13; 358/1.12; 358/1.15
(58) Field of Classification Search ................. 358/1.1, 358/1.13, 1.15, 1.3
See application file for complete search history.

(56) References Cited

U.S. PATENT DOCUMENTS 5,917,511 A * 6/1999 Ueda ........................... 347/19
6,614,549 B1 * 9/2003 Hlava ........................ 358/1.15
6,789,864 B2 * 9/2004 Phillips ........................ 347/7
6,938,971 B2 * 9/2005 Gom z et al. ................. 347/14
2002/0140973 A1 * 10/2002 Imaizumi et al. ........... 358/1.15
2003/0016374 A1 * 1/2003 Christodoulou et al. .... 358/1.12
2004/0190967 A1 * 9/2004 Mizuno et al. ................ 400/76

FOREIGN PATENT DOCUMENTS

JP 11-327855 11/1999
KR 0219586 6/1999

* cited by examiner

*Primary Examiner*—Mark K Zimmerman
*Assistant Examiner*—Ming Hon
(74) *Attorney, Agent, or Firm*—Fitzpatrick, Cella, Harper & Scinto

(57) ABSTRACT

Job starting processing and terminating processing of a printer is kept to the necessary minimum thereby to increase the efficiency of the printer. Print output is performed in accordance with print settings designated in print information, such as a print style of binding, the number of copies, and paper size, and a file output port, which is a characteristic of the present invention, is used as an output destination. An output print job file is sent to a common folder monitored by a job manager. The job manager executes scheduling operations at the time when the print job file is received in the common folder. The job manager also determines order characteristics, such as priority and quality, of the print job file, rearranges job schedules, and generates a stabilizing processing execution job when stabilizing processing is necessary.

13 Claims, 16 Drawing Sheets

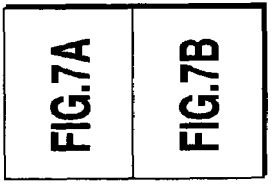
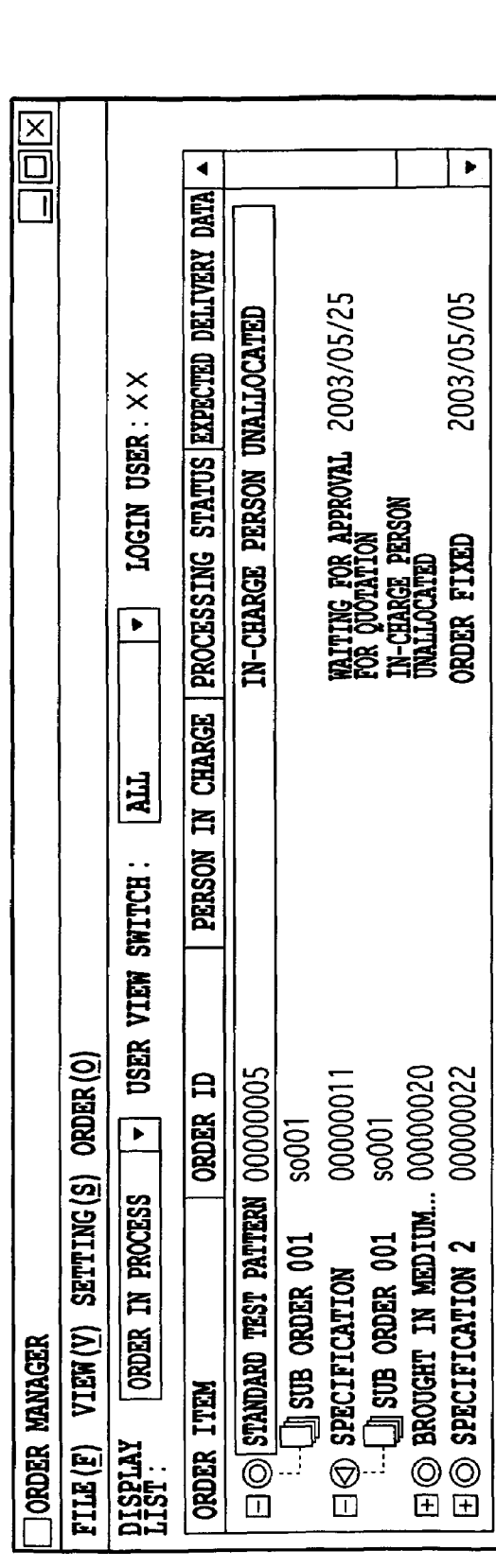

FIG.8

| FIG.8A |
|--------|
| FIG.8B |

FIG.8A

| | ITEM | MEANING (SETTING VALUES) |
|---|---|---|
| ORDER GENERAL INFORMATION | TYPE OF SERVICE | OUTPUT/BINDING SERVICE |
| | | POSTER/PANEL |
| | | COPY SERVICE |
| | | RE-ORDER |
| | | ARCHIVAL DOCUMENT |
| | ORDER NAME | ARBITRARY CHARACTER STRING |
| | ORDER ID | 32-BYTE UNIQUE CHARACTER STRING |
| | ENTRY | NETWORK ENTRY |
| | | MEDIUM ENTRY |
| | FINISHING | 1 FILE → 1 DOCUMENT |
| | | MULTIPLE FILES → 1 DOCUMENT |
| | | MULTIPLE FILES → MULTIPLE DOCUMENTS |
| | THE NUMBER OF UPLOAD FILES | THE NUMBER OF ENTRY FILES |
| | UPLOAD FILE NAME | ARBITRARY CHARACTER STRING |
| FILE INFORMATION | FILE ID | 32-BYTE UNIQUE CHARACTER STRING |
| | THE NUMBER OF PAGES | DESIGNATE VALUE |
| | OS TYPE | Wooooo/Mooooooooo/Uooo |
| | | Woooooooo Wooo |
| | | Woooooooo Eooo |
| | DOCUMENT CREATION APPLICATION | .. |
| | | OTHER |
| | APPLICATION VERSION | ARBITRARY CHARACTER STRING |

| | | |
|---|---|---|
| PRINT STYLE | FINAL SIZE | B0, A0, B1, A1,, |
| | OUTPUT SHEET ORIENTATION | PORTRAIT |
| | | LANDSCAPE |
| | TYPE OF BOOKBINDING | PERFECT BINDING |
| | | BOOKLET BINDING |
| | | RING BINDING |
| | | STAPLE |
| | | OTHERS (COMMENTS) |
| | BINDING POSITION | LEFT (MARGIN INDEFINABLE) |
| | | RIGHT (MARGIN INDEFINABLE) |
| | | TOP (MARGIN INDEFINABLE) |
| | | OTHERS (COMMENTS) |
| | PRINT (BODY COPY) | ONE-SIDE |
| | | DOUBLE-SIDE |
| | COLOR MODE (BODY COPY) | MONOCHROME |
| | | COLOR |
| | SHEET TYPE (BODY COPY) | BLACK-AND-WHITE STANDARD PAPER |
| | | COLOR STANDARD PAPER |
| | | THICK PAPER (THICKNESS DEFINABLE) |
| | | COATED THICK PAPER |
| | | COLOR PAPER (COLOR DEFINABLE) |
| | | MONOCHROME OHP FILM |
| | | COLOR OHP FILM |
| | PUNCH HOLES | 2 HOLES, 3 HOLES, 4 HOLES, 6 HOLES, 30 HOLES |
| | FOLDING | 1 FOLD, 2 FOLDS, X FOLDS |
| | COVER | WITH COVER |
| | | WITHOUT COVER |
| | PRINT (COVER) | NOT PRINT |
| | | ONE-SIDE |
| | | DOUBLE-SIDE |
| | PRINT (BACK COVER) | NOT PRINT |
| | | ONE-SIDE |
| | | DOUBLE-SIDE |
| | COLOR MODE (COVER/BACK COVER) | MONOCHROME |
| | | COLOR |

FIG.8B

STABILIZING PRINT JOB MANAGER

BACKGROUND OF THE INVENTION

1. Field of the Invention

The present invention relates to an information processing apparatus, an information processing method, and an information processing program product, and more particularly, to those information processing apparatus, information processing method, and information processing program product that achieve efficient image formation in an image forming device connected to a network.

2. Description of the Related Art

There have been commercial printing companies that produce printed products at requests from customers such as a personal user or enterprise. These printing companies prepare printed products by using print data (or original copy) given by customers according to their instructions of print style, the number of copies, or delivery time, and then delivers the printed products to those customers.

Most of these printing companies use a large-scale system, such as an offset prepress and printing machine, which has been known over decades. Nowadays, however, electrophotographic printers or inkjet printers exhibit high processing speeds and high image qualities, and therefore printed matters comparable to those from the offset prepress printing machine can be output and delivered in a short time by using those recent printers. In particular, business styles of commercial printing specializing in a small volume of printing or short-time delivery, which are called "Copy Service", "Printing Service", or "Print On Demand (POD) Center", are now seen in the market.

When asking for a print service of such printing business, a user provides a printing company with an original paper copy or an electronic medium (FD, MO, CD-ROM, etc.) having recorded original print data. Furthermore, the user mails or brings directly to the company, a print in structions form (purchase order form) in which the number of copies to be printed, a type of binding required, and a deadline for delivery are described.

On the other hand, an Internet-or Intranet-based online print ordering system is already put into practical use. For example, in "DotDoc. Web" released by Fuji Xerox Co., Ltd., a user gains access from a computer to the homepage of a printing company, and inputs necessary data, such as orderer information (delivery point and the like), print style, or the number of copies, in a printing request page (form). Then, the user sends the input data together with an original document file thereby to complete a print order.

The printing company, upon receipt of the printing request from the user, prepares a print instructions form and schedules printing processing. Then, according to the planned schedule, printing and binding operations are performed by a printer which is connected to an operation management computer, and finally printed products are delivered to the customer.

As described above, a printing company performing printing processing requested by users needs to finish printing with stable quality certainly before a specified deadline for delivery. Furthermore, at a large printing center, multiple operators are required to use a great variety of printers and operating computers for parallel handling of many printing requests (orders). Therefore, it is necessary to utilize resources, such as human (operator) and machinery, as efficiently as possible.

A more concrete task of printing companies to ensure stable quality of printed products is to establish a reasonable print schedule in consideration of operating conditions of printers and to proceed with printing processes according to this schedule. A printer, which performs actual printing processing, is involved in many factors affecting the print quality, such as paper curling resulting from heat applied by a fuser or photoconductor drum, or color changes during the printing process. Printing companies must prevent these factors of deteriorating the print quality, and prepare printed products desired by users certainly before the delivery date. Furthermore, it is desirable to flexibly cope with the case where the printing schedule must absolutely be modified because of an urgent printing order.

One of approaches for maintaining the print quality to achieve the above described task is to equip a printer with a function by which the printer itself carries out calibration processing automatically upon detection that a certain period of time elapses or that a designated number of copies are printed. Note here that the calibration processing may be done when environmental changes (temperature or humidity changes) are detected at the position where the printer is placed.

Furthermore, there are proposals for a printer management system by which maintenance operations can easily be performed by handling a maintenance request as a print job. According to one of those proposals, for example, nozzle cleaning processing is executed as a utility function of the printer driver for an inkjet printer. In the event of occurrence of failure in a printer during processing usual print data, appropriate maintenance notice is issued from this printer management system, and a maintenance request is sent from the printer management system to the printer in the same manner as in the case of a usual print job. All the user needs to do is to give his/her desired job instruction to one printer management system, and thereby both usual printing and maintenance operations can be performed (e.g., Japanese Patent Application Laid-Open No. 11-327855 (1999)).

The foregoing conventional technology ensures printed image quality and tint but does not ensure the quality of printed products including recording paper quality. In particular, when color printing orders are received successively, printing processing loads are concentrated on a printer, and a temporal operational halt for the automatic calibration processing does not offer sufficient cooling down effect. Moreover, the prevention of unforeseen failure caused by overheat can scarcely be expected. Furthermore, the conventional technology does not consider whether the time required both for stabilizing processing of the printer and for printing processing based on print jobs is reserved before a user's designated delivery date comes. Furthermore, the conventional system such as the above printer management system can handle a maintenance request in the same manner as in the case of print jobs, but does not automatically determine whether the stabilizing processing is necessary or not depending on a characteristic of each print job. Therefore, the execution of the stabilizing processing inevitably relies upon an operator's decision, and thus the system efficiency is not improved disadvantageously.

SUMMARY OF THE INVENTION

In order to overcome the foregoing problems, according to the present invention, there is provided an information processing apparatus generating an image forming job in accordance with image forming data and attribute information about image formation of the image forming data and sending the generated image forming job to an image forming device, and this information processing apparatus is characterized by comprising: a determining unit that determines whether stabilizing processing of the image forming device is necessary and what type of the stabilizing processing is required, in accordance with the attribute information; a calculating unit that calculates an image forming time required for image formation and an execution time of the stabilizing processing, in accordance with the attribute information and the image forming data; a generating unit that generates a stabilizing processing execution job for causing the image forming device to execute the stabilizing processing; and a scheduling unit that schedules the image forming job and the stabilizing processing execution job in accordance with the image forming time and the stabilizing processing execution time.

Furthermore, there is provided an information processing method for generating an image forming job in accordance with image forming data and attribute information about image formation of the image forming data and sending the generated image forming job to an image forming device, and this information processing method is characterized by comprising: a determining step of determining whether stabilizing processing of the image forming device is necessary and what type of the stabilizing processing is required, in accordance with the attribute information; a calculating step of calculating an image forming time required for image formation and an execution time of the stabilizing processing, in accordance with the attribute information and the image forming data; a generating step of generating a stabilizing processing execution job for causing the image forming device to execute the stabilizing processing; and a scheduling step of scheduling the image forming job and the stabilizing processing execution job in accordance with the image forming time and the stabilizing processing execution time. This information processing method can be executed by a program, and furthermore, a program for executing this method can be stored in a computer-readable medium.

The above and other objects, effects, features and advantages of the present invention will become more apparent from the following description of embodiments thereof taken in conjunction with the accompanying drawings.

BRIEF DESCRIPTION OF THE DRAWINGS

FIG. 7 is a diagram showing the relationship of 7A and 7B;

FIG. 7A is an operational screen of an order manager according to the one embodiment;

FIG. 8 is a diagram showing the relationship of 8A and 8B;

FIG. 8A is a diagram showing an example of contents stored in an order information file;

FIG. 8B is a diagram showing an example of contents stored in an order information file;

DETAILED DESCRIPTION OF PREFERRED EMBODIMENTS

Preferred embodiments of the present invention will be described below with reference to the accompanying drawings.

First Embodiment

Figure 1:
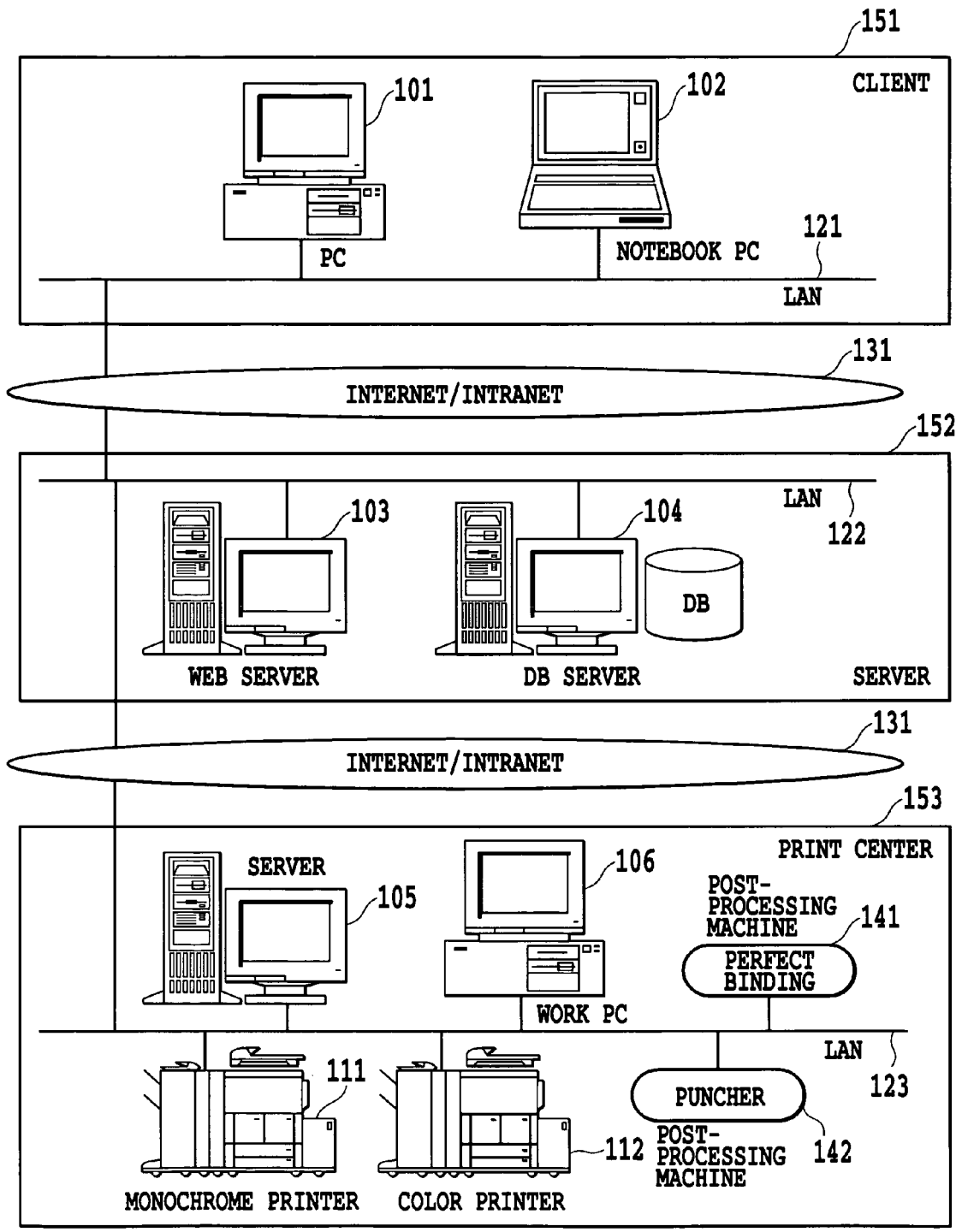
FIG. 1 is a diagram showing a system configuration of a print system according to one embodiment of the present invention.

FIG. 1 is a diagram showing the entire configuration of a print system according to the present invention. For ease of understanding, the present invention will be shown and described in the environment of the entire print system, but is not limited to this environment.

In FIG. 1, a client 151 is a general user's notebook PC 102, for example, which is connected to the Internet at home, and a business PC 101, for example, which is connected to the Intranet in the office of a company. A server 152 includes a WEB server 103 that provides a user with entry contents for submission of a printing request or manuscript, and a DB server 104 that stores the submitted printing request as an order note (order form) and also stores the electronically submitted manuscript. Note here that the Web server and the DB server can be provided in a single server, but they will be described separately for convenience in the present invention.

Two or more of a print center 153 may be provided for the server 152, and information of printers provided in the print center is notified to the server 152 in advance, so that the server 152 distributes the printing requests among those printers on the basis of this information. The print center 153 includes a server 105 that periodically collects the order forms and manuscripts accumulated in the server 152 and implements the print system of the present invention. The print center 153 further includes a work PC 106 that offers usability and operability by GUIs and receives various services provided by the server 105. The printer center 153 further includes a monochrome printer 111 and a color printer 112 that serve as an actual output destination, and a binding machine 141 used for off-line binding. It is, of course, understood that the configuration and environment of the print center are not limited to the above.

In an example of this embodiment, the client and the server, and the server and the print center are connected to each other via an Internet/Intranet 131. In typical cases, the client and the server are interconnected via the Internet, and the server and the print center are interconnected via the Intranet built using a dedicated line. The present invention is, however, not limited to such an environment, and is applicable to even an environment such that the server is included in the print center.

The notebook PC 102 and PC 101 of the client has a browser for viewing the entry contents provided by the WEB server. As this browser, Internet Explorer of Microsoft(R) Corporation is generally used in most cases, but NetScape of NetScape Communications Corp., or the like can also be used. This embodiment is not influenced by the type of a browser. Manuscript data is uploaded by use of the entry contents.

The WEB server 103 provides the entry contents. The entry contents have a built-in edit control for inputting a print style for binding, print settings such as the number of copies and paper size, a deadline for delivery, client information, and a delivery point, and also have a built-in file designation control for uploading manuscript data. The calculation of charges corresponding to the input printing request and the fixing of the input information items are implemented by a service module running on the WEB server 103, but these processing operations have no direct relation to the present invention, so the descriptions thereof will be omitted. Furthermore, the WEB server 103 stores an order form of the fixed printing request (the details of the printing request and the file name of the manuscript data are described in the order note) and a manuscript data file in the DB server 104.

The DB server 104 is installed with database management software which can be general software such as OracleDatabase of Oracle Corporation. In response to a data acquisition request from the server 105 which will be described in detail later, the DB server 104 can send the requested order form and manuscript data. A DB schema (not shown) is generally mainly composed of a print center master table (having as a member, information of location, contact address, and the like, device master, and binding machine master), a device master table (device configuration information of color/monochrome, the number of copies printed, options, and the like), and a binding master table (information of puncher, perfect binding machine, or the like). By referring to these tables, the server 105 in the print center 153 receives an order allocated thereto.

The server 105 receives notice of the fixed order from the WEB server, and acquires the order form and manuscript data file from the DB server. Then, printing processing and the like are performed based on the acquired order form by the print system comprising an order manager, a work flow manager, a job manager, a device manager, a device scheduler, all of which will be described later.

The work PC 106 is a computer for displaying and instructing a printing process by means of a user-friendly operational screen. An operator can receive various services of the server 105 by using this work PC. Specifically, the GUI interface is used to extract a manuscript data file stored in the server 105, activate a predetermined application, adjust a print style, and issue an instruction of printing based on the designated print settings.

The monochrome printer 111 and color printer 112 are configurable in any desired format in each print center, and in general cases, a high-speed monochrome printer and a high-quality color printer are used in combination. All processing schedules of these units are arranged by the device scheduler of the server 105.

A binding machine 141 is an off-line binder for binding of papers output from a printer, and is operable as a stapler, puncher, perfect binding unit, and ring-binding unit. Furthermore, by connecting these units to the network, a conditional status thereof can be acquired. The conditional status here means part of information of processing history in an off-line unit, and contains error information. Information of the cause of error, or the state of progress of printing processing at the time of occurrence of the error (how many copies are printed, or the like) can also be acquired, but the arrangement of the above units is different for each print center as in the case of the printer.

Figure 2:
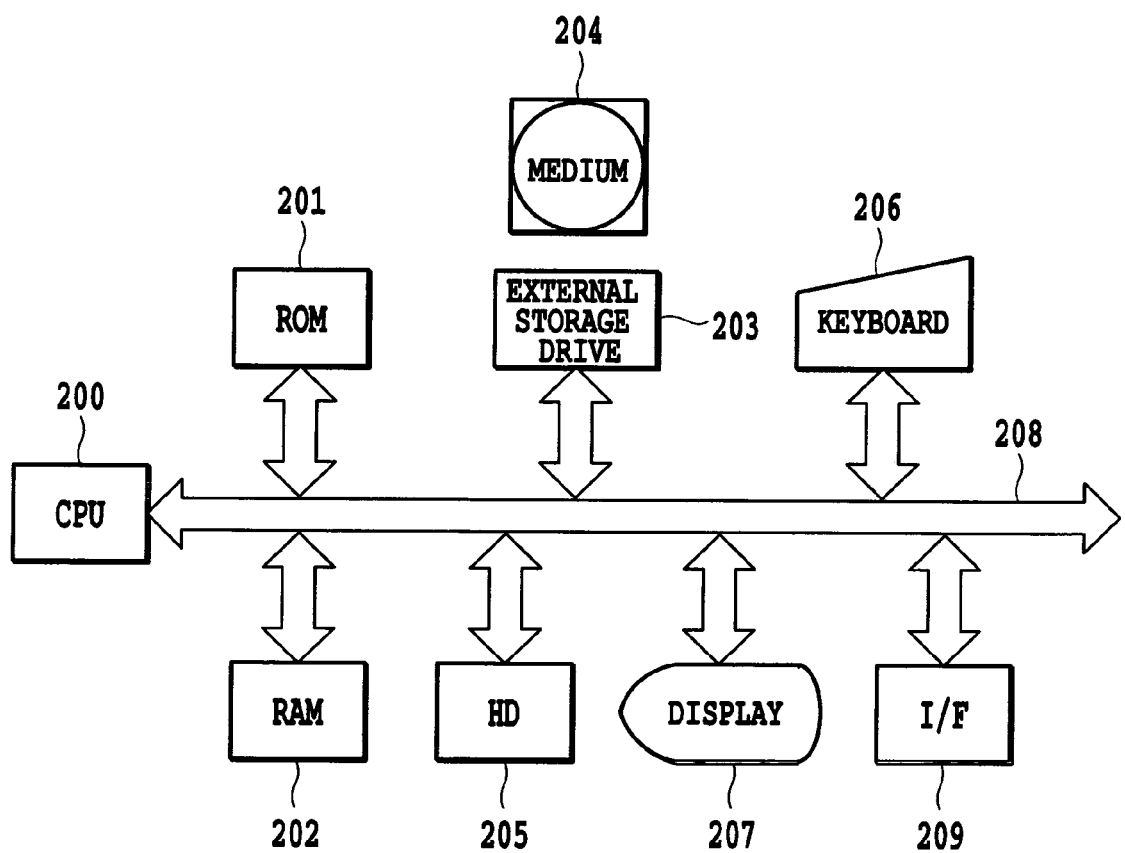
FIG. 2 is a block diagram schematically showing a configuration of a client computer according to the one embodiment.
Figure 4:
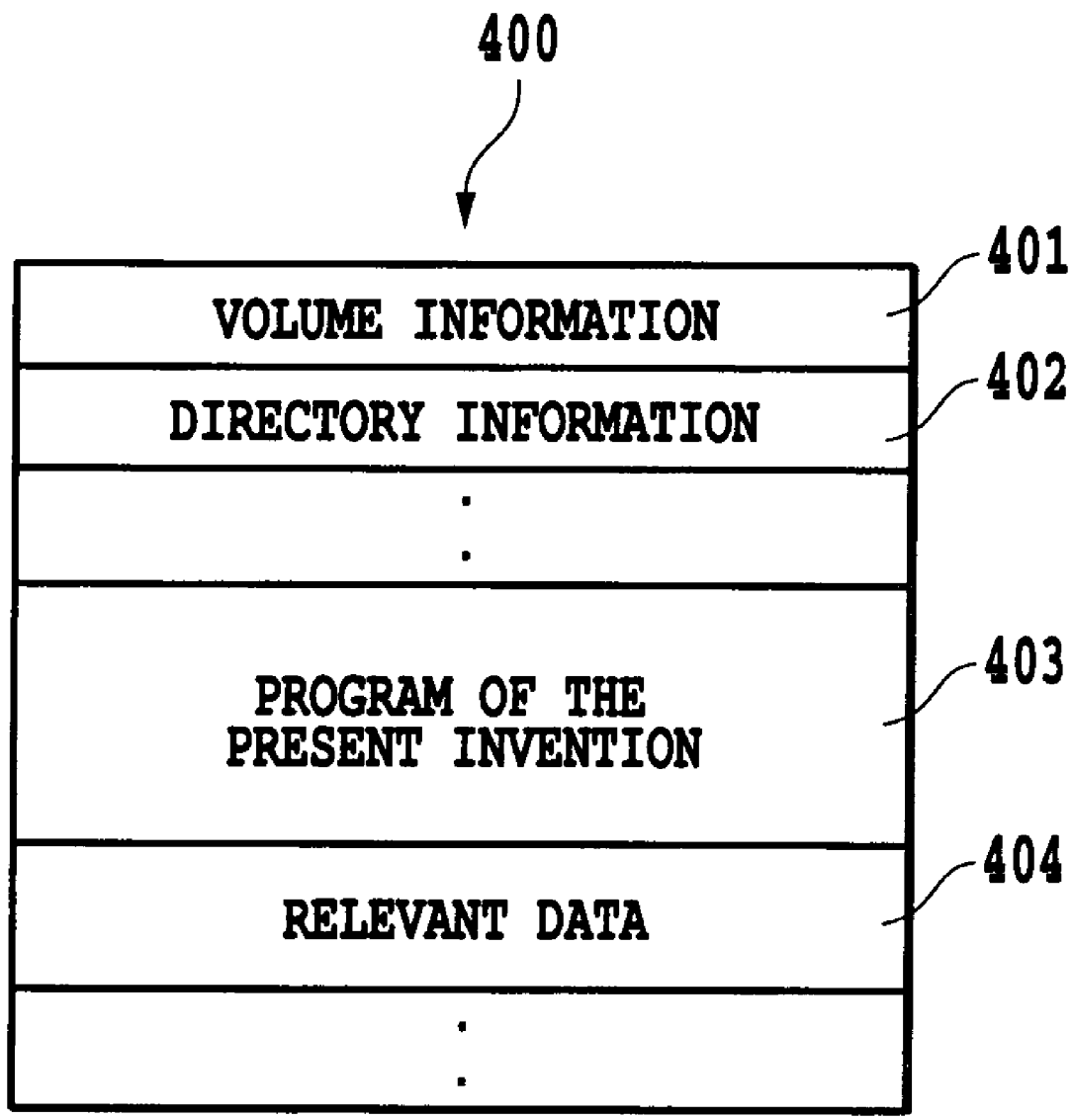
FIG. 4 is a diagram of a memory map of data stored in the FD according to the one embodiment of the present invention.

FIG. 2 is a block diagram showing a schematic configuration of a computer used as the WEB server 103, DB server 104, server 105, and work PC 106. A CPU 200 executes programs such as an application program, printer driver program, OS, and network printer control program which are stored in an HD (Hard Disk) 205, and controls a RAM 202 so that information and files necessary to execute these programs are temporally stored therein. In a ROM 201, programs such as a basic I/O program, and various types of data such as font data and template data used in document processing are stored. The RAM 202 functions as a main memory, work area, and the like of the CPU 200. Reference numeral 203 denotes an external storage drive by which programs stored in a medium 204 are loadable onto the computer system. The medium 204 stores programs and relevant data described in this embodiment, and the details thereof are shown in FIG. 4.

The HD 205 holds the application program, printer driver program, OS, control program, relevant program, and so forth. A keyboard 206 is used when a user designates and inputs commands, such as a device control command, for a client computer. A display 207 displays the command input from the keyboard 206, the state of a printer, and the like. A system bus 208 manages a data flow within the client computer, and a network interface (referred to as I/F, hereinafter) 209 is a Local Area Network (LAN) or a communication interface for connection with the Internet.

Figure 3:
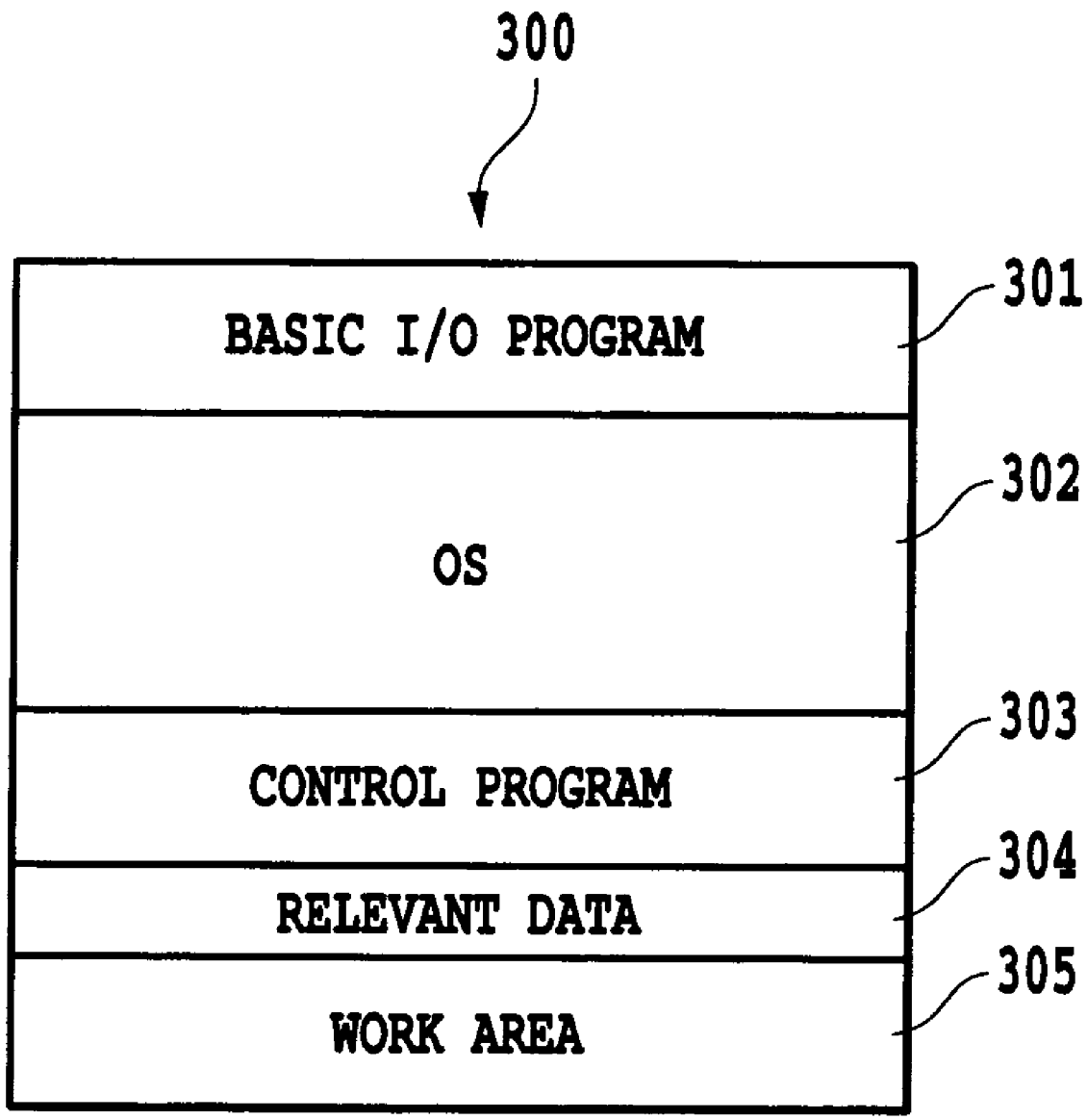
FIG. 3 is a diagram of a memory map at the time when a program stored in an FD is developed on a RAM according to the one embodiment of the present invention.

FIG. 3 shows a memory map in a condition where a program of the present invention is executable when loaded onto the RAM 202. In this embodiment, the program and relevant data in the medium 204 are loaded directly onto the RAM 202 to execute them. In addition to this case, the program of the present invention may be loaded from the HD 205 onto the RAM 202 each time this program in the medium 204 is run. Furthermore, a medium for recording the program of the present invention may be an FD, CD-ROM, DVD, IC memory card, and so forth.

Furthermore, it is allowable that the program of the present invention is recorded in the ROM 201 to form a part of the memory map so that this program can be executed directly by the CPU 200. A basic I/O program 301 is an area containing a program having an IPL (initial program loading) function for loading an OS program from the HD 205 onto the RAM 202 when the main power of the computer is turned on and starting the operation of the OS. An OS 302 is used to develop a control program 303 and relevant data 304. A work area 305 is used when the CPU 200 executes the program of the present invention.

In FIG. 4, reference numeral 400 denotes data contents in the medium 204. The data contents 400 include volume information 401, directory information 402, a program 403 described in this embodiment, and relevant data 404 of the program 403. The program 403 is program-coded in accordance with flowcharts of this program shown in FIGS. 10 to 12.

Figure 5:
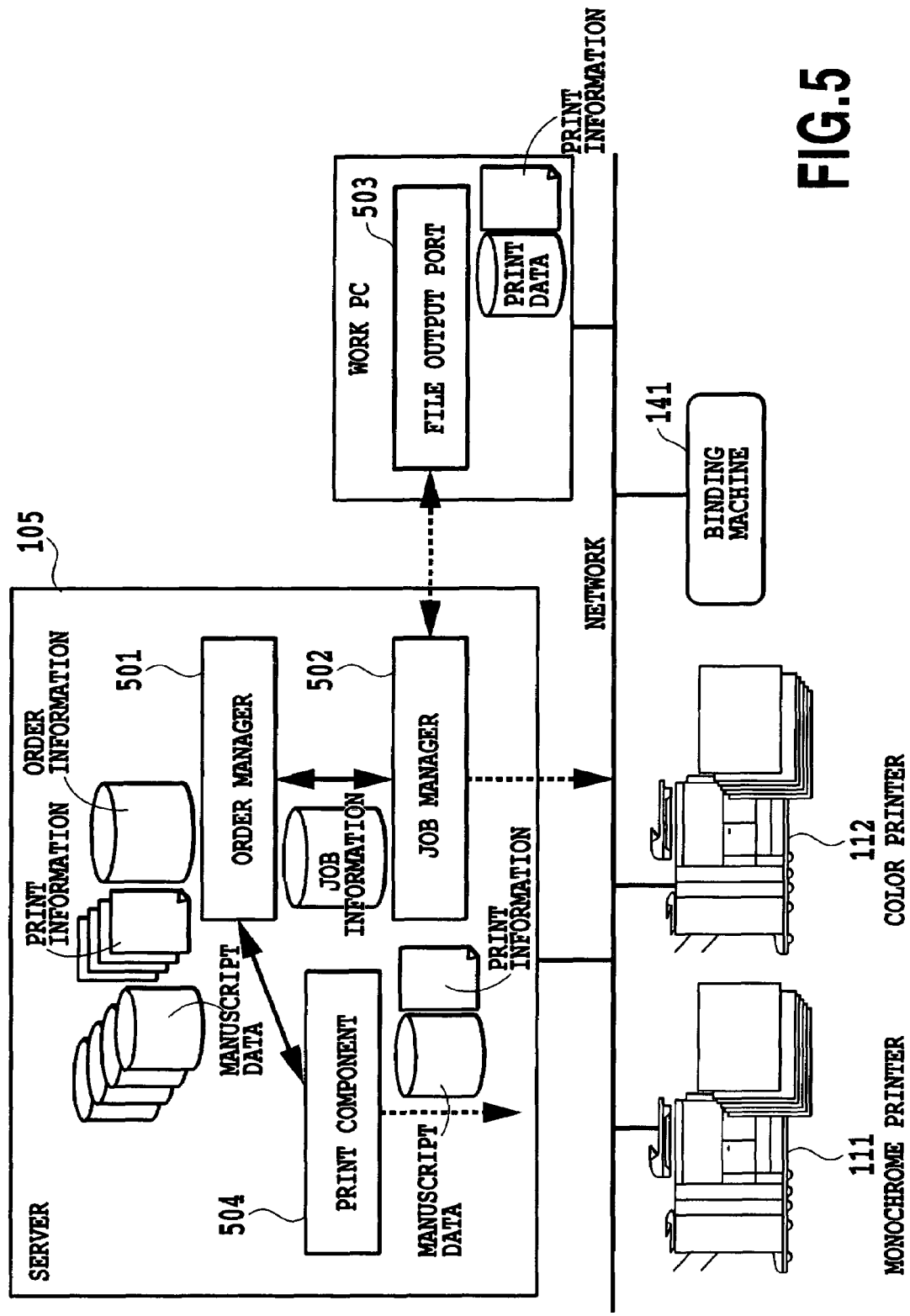
FIG. 5 is a diagram of a print system configuration according to the one embodiment of the present invention, which is shown by each functional module.

FIG. 5 shows a configuration of a print system according to one embodiment of the present invention, which is shown by each functional module. An order manager 501 is software for managing received orders and provides an operational screen shown in FIG. 7 which will be explained later. The order manager 501 is operable to extract print information from order forms which are collected from the WEB server 103 or DB server 104 and to create an order information file necessary for printing together with a pass name of the manuscript data file.

FIG. 8 exemplarily shows the contents stored in the order information file, in which the description of setting values will be omitted. An operator can check the state of progress of the order by viewing the operational screen provided by the order manager 501. The order manager appropriately uploads the same order information on the WEB server 103 so that this order information can be displayed on a processing state content screen (not shown) provided by the WEB server 103, so as thereby to allow the WEB server to provide the same progress information for users. For security protection, this order information is stored until the printing processing is finished and printed products are delivered, but is of course deleted after the delivery.

A job manager 502 receives print data in a PDL format (hereinafter referred to as print job file) that is sent from a file output port 503 installed on a work PC which will be described in detail. The job manager 502 then sets schedules for jobs after determining as to whether stabilizing processing is necessary or not, and sequentially causes an output destination printer to perform direct printing of the print job file. The direct printing here means to print the print job file by writing it directly to an output port without using a printer driver.

The file output port 503 is operative similar to a general FILE port, and has an additional function for automatically generating an output file name associated with a job. This output file name is displayed on the work PC as an output destination port of the print system. When the file output port is used for printing, all print data is stored in a file as a print job file, and is given to the job manager 502. A print component 504 downloads print information and manuscript file of the order designated by the order manager into the work PC. Download is performed based on a general FTP protocol or according to a file copy method, but not limited thereto.

Figure 6:
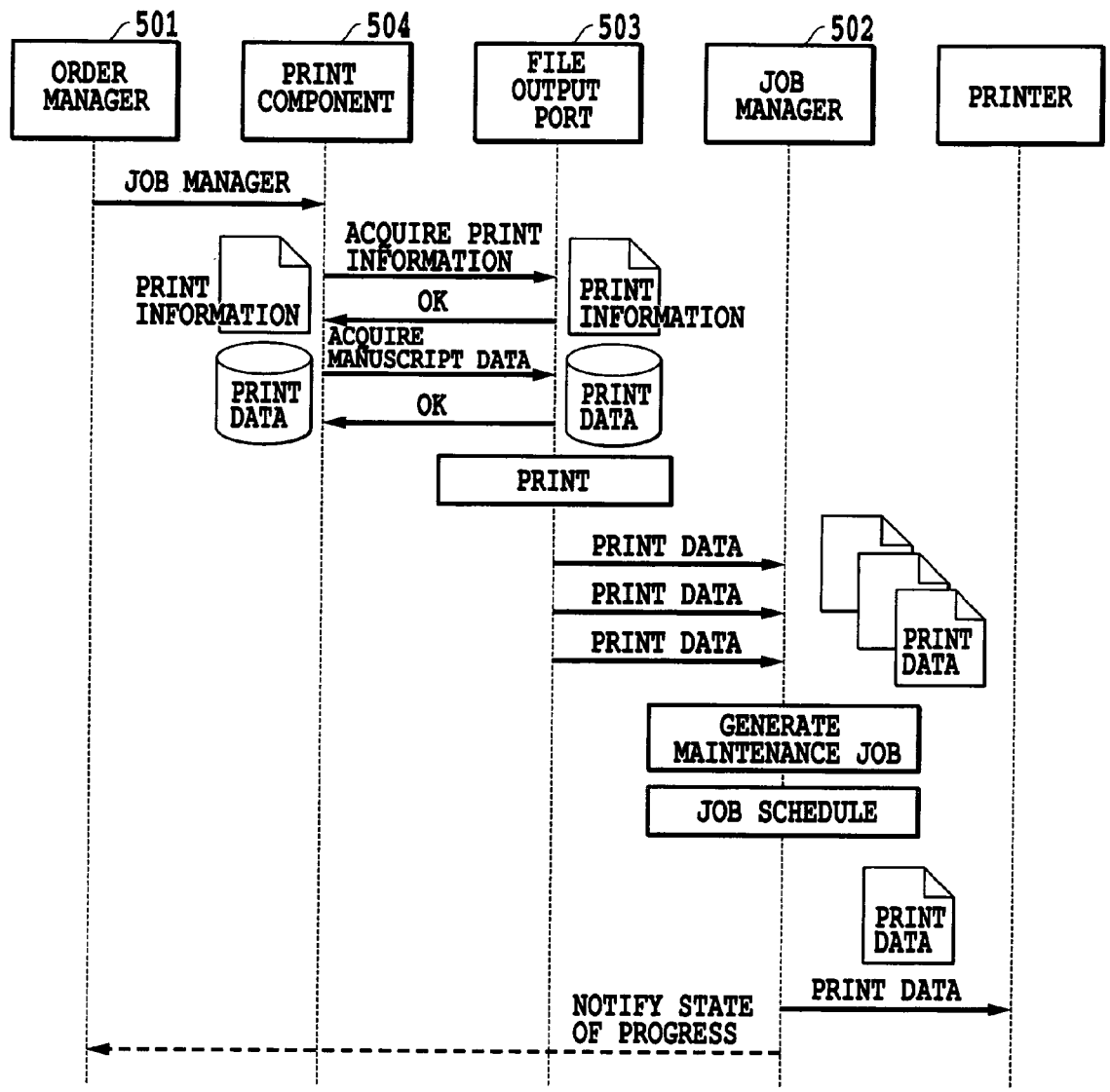
FIG. 6 is a sequence diagram showing a processing flow according to the one embodiment of the present invention.

FIG. 6 is a sequence diagram showing a processing flow according to the one embodiment of the present invention. When an order is fixed, order information is accumulated in the order manager 501. An operator accesses the order manager 501 from the work PC to acquire the order information which he/she intends to process. Upon acquisition of the order information, print information and the accompanying manuscript data are downloaded via the print component 504. The operator starts an application on the basis of the downloaded manuscript data, and makes edits such as a layout change as necessary. Then, print output processing is executed in accordance with the print style of binding designated in the print information and the print settings of the number of copies, paper size, and the like. At this time, an output destination is the file output port 503 which is a characteristic of the present invention.

At the same time with the completion of the print output processing, the output print job file is sent to a common folder (hereinafter, referred to as Hot folder) that is monitored by the job manager 502. The job manager 502 monitors this Hot folder (i.e., standby for a file generation event) so as to execute schedule management processing at the time when the print job file is received in the Hot folder. The job manager 502 rearranges job schedules on the basis of the order information regarding priority and quality of the print job file and attribute information regarding the print settings. At this time, the job manager 502 generates a stabilizing processing execution job if stabilizing processing is necessary, and then schedules the stabilization processing execution job by adding it to a print job. Print data is transmitted to a printer with appropriate timing according to the schedule, so that printing processing is executed.

Figure 7B:
FIG. 7B is an operational screen of an order manager according to the one embodiment.

FIG. 7 shows an operational screen of the order manager according to the one embodiment of the present invention, in which a list display screen for indicating the state of progress of an order on the basis of the order information and a tag display screen for indicating detailed information of the order are displayed specifically. An operator can check the state of progress of an order by viewing this operational screen. The processing program in this embodiment is an application running on Windows OS of Microsoft (R) Corporation, but may alternatively be HTML-based WEB contents. For convenience, this embodiment handles the case where Windows (R) application is used. The upper list screen indicates general information, such as an ID for identifying orders and a person in charge, and a processing status. When one order is selected, the details of order information regarding the selected order are displayed in the lower tab screen. The displayed contents include print settings shown in FIG. 8.

Figure 9:
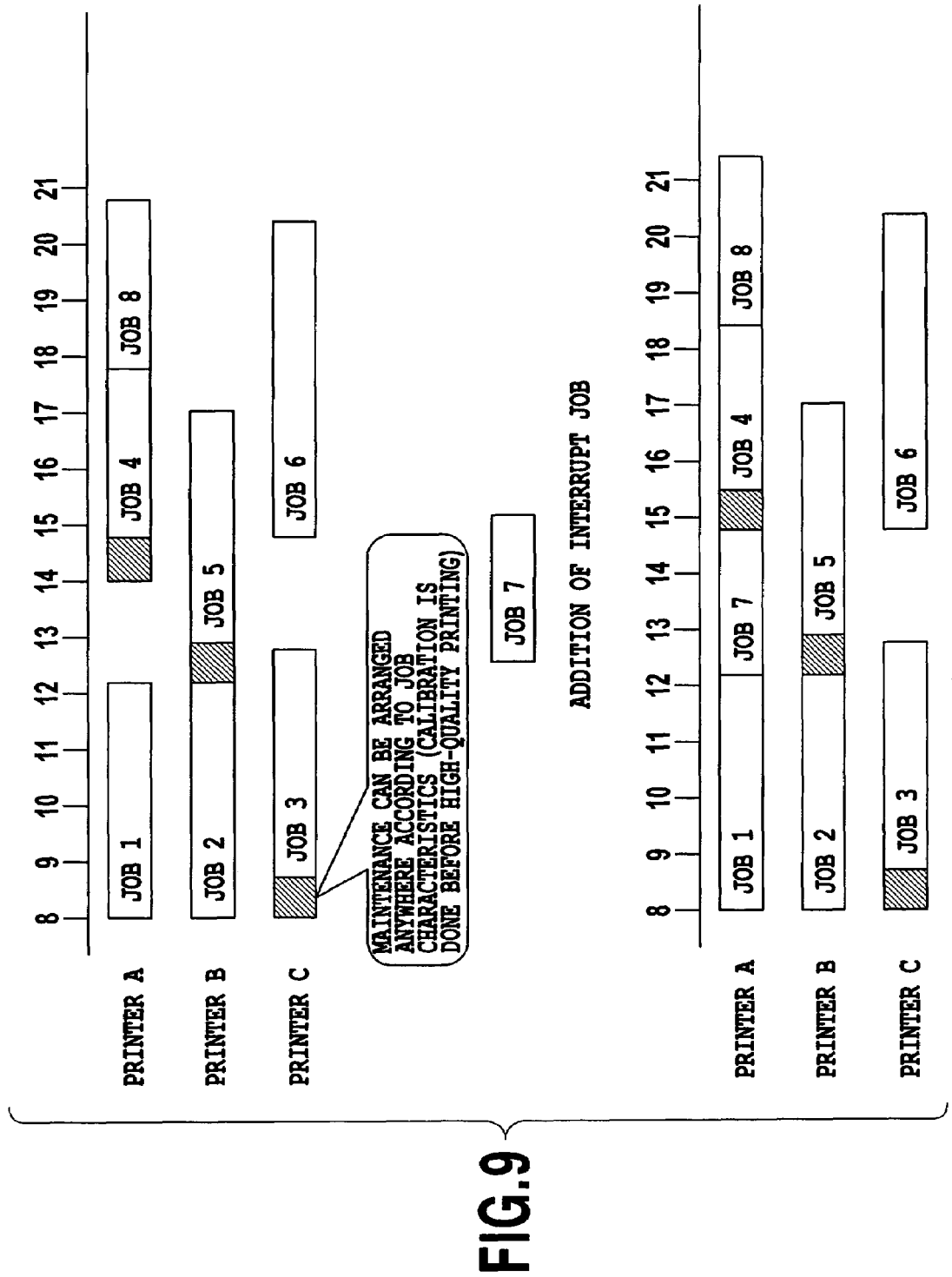
FIG. 9 is diagram showing a job scheduling concept of a job manager according to the one embodiment.
Figure 13:
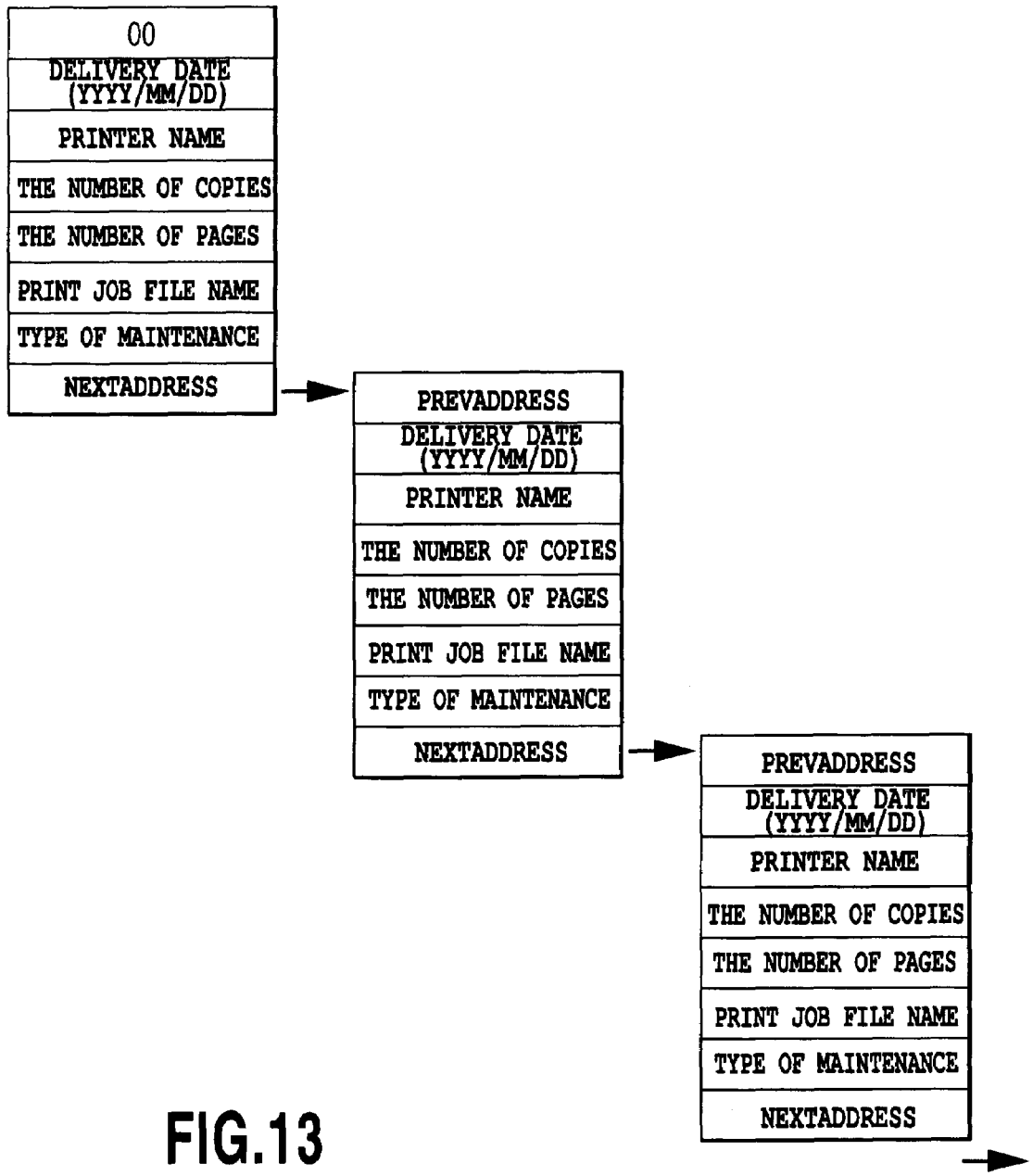
FIG. 13 is a diagram showing job information having a list structure according to the one embodiment of the present invention.
Figure 14:
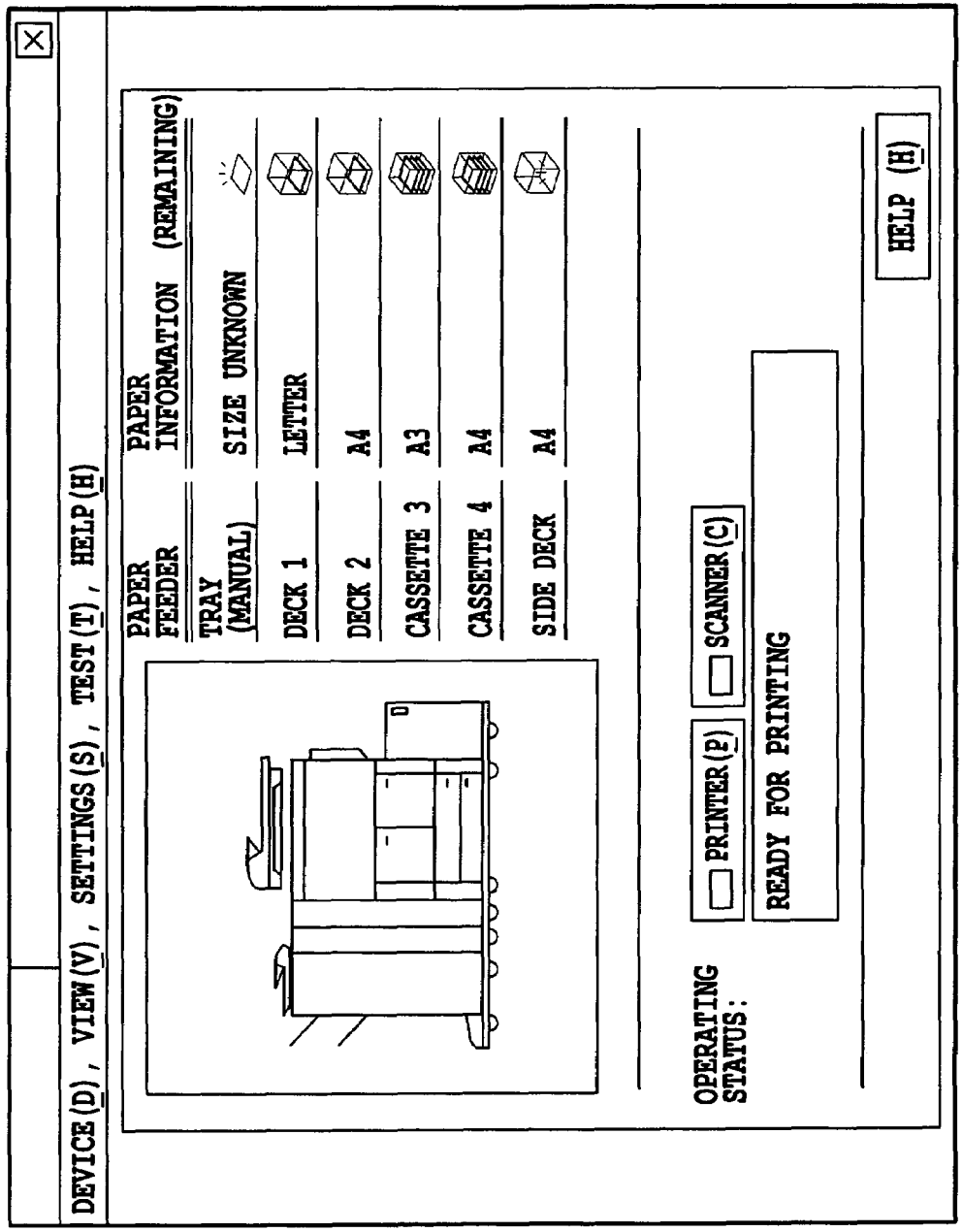
FIG. 14 is an exemplary view of a property screen for checking a present state of a printer according to the one embodiment of the present invention.

FIG. 9 is a diagram illustrating a concept of job scheduling of the job manager 502. When a print job file is registered (or added) in the job manager, job information is generated which has a linear list structure as shown in FIG. 13. The job information contains a delivery date, need or no need for stabilizing processing, the name of output destination printer, the number of copies ("1" is stored when jobs are distributed in units of the number of copies in the application, and the number of copies is stored when a printer prints the number of copies), a print job file name, a stabilizing processing execution job, and the like. The number of copies and job size are reflected in the length of a print job rectangle in a scheduling screen of the job manager shown in FIG. 9. The job rectangle corresponds to the volume of a print job to be output or the output capability of an output destination printer (the number of sheets of paper which can be output within a certain period of time). That is, the job rectangle corresponds to the time required for job printing. For example, when a printer, which has the capability of single-sided printing of 3,000 pages in an hour, is used to print a print job corresponding to 9,000 pages of papers, the time required for printing processing is three hours. Accordingly, the job rectangle is displayed with the size of three hours in the scheduling screen. As described above, the job manager 502 calculates the time required for printing in accordance with the job information. Addition, deletion, and insertion of the job information are done by general linear list processing, so the description thereof will be omitted.

Figure 10:
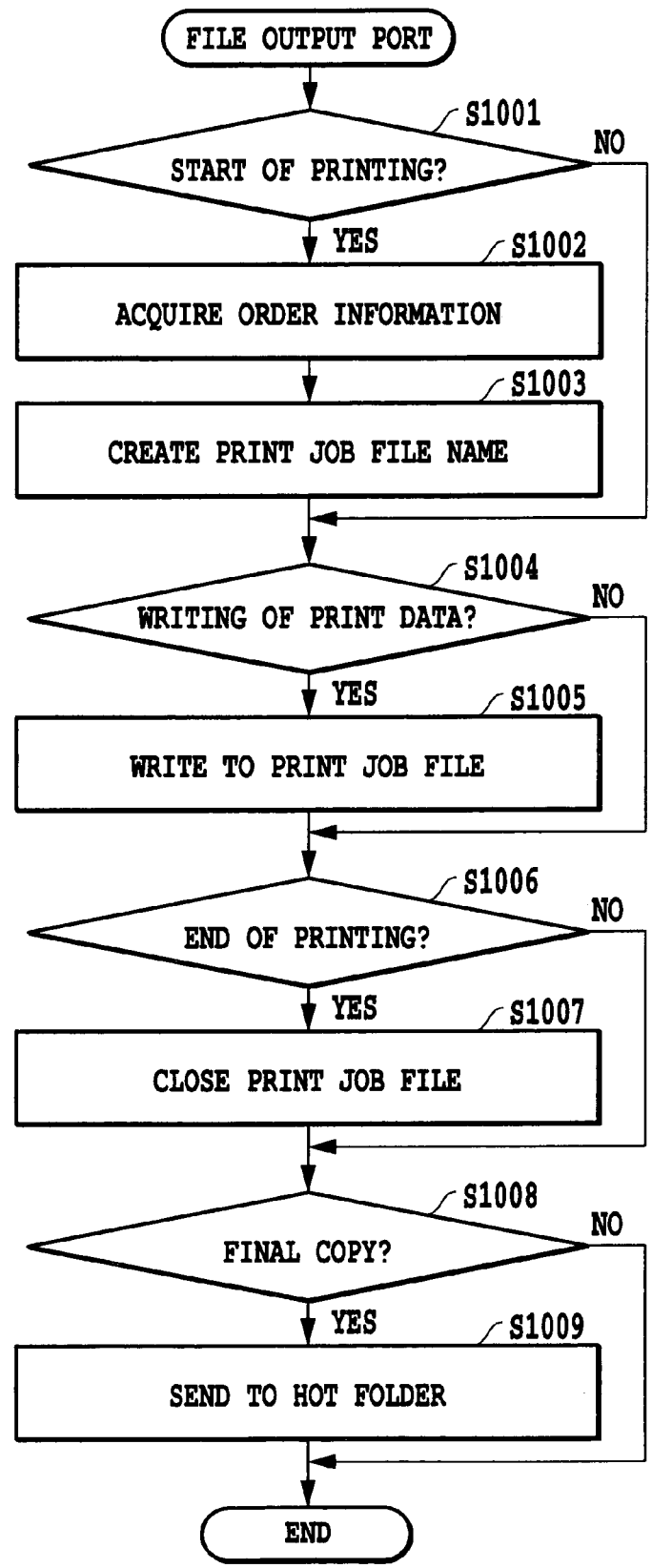
FIG. 10 is a flowchart of operations of a file output port according to the one embodiment.

FIG. 10 is a flowchart of operations of the file output port in FIG. 5. The file output port is added as one module of the print system, and serves as an output destination port from an application. Therefore, the file output port is activated, based on the printing processing transition of the print system, at the occurrence of each event such as starting of print output, writing of print data, or end of printing. First, at the print output starting event, determination is made in step S1001 as to whether the print output is started. When print output starting processing is performed as a result of the determination, the order information obtained from the print component 504 immediately before the print output is acquired. The acquired order information is stored as an order file (.ODR) whose filename is the order number. The order information contains the order number and the-number-of-copies information. In step S1003, a unique print job file (.JOB) is created whose file name is order number + copy number (new file). Next, at the print data writing event, determination is made in step S1004 as to whether print data is written to the file output port. When writing processing is performed as a result of the determination, the print data is written to the print job file in step S1005 (writing). The written print data is converted to PDL data by a printer driver (not shown). Next, at the print output ending event, determination is made in step S1006 as to whether the print output is finished. When the print output is finished as a result of the determination, the print job file is closed in step S1007, and print job file generation processing is completed (terminated). Simultaneously, a copy number count is decremented. Subsequently in step S1008, determination is made as to whether the final copy of multiple copy printing is printed. This determination is done by using the copy number count decremented in step S1007. When the final copy is printed as a result of the determination, a file transfer thread for sending the print job file to a Hot folder designated by the job manager 502 is started. The file transfer thread is basically the same as processing of file copy to a common folder, in which the print job file and order file generated by the above described processing are sent to the Hot folder. At this time, the order file is sent later than the print job file for confirmation that the final file is received in the Hot folder of the job manager 502 (the completion of file transmission is confirmed when the order file is found).

In this manner, the print data output to the file output port is written in a print job file for each copy in the case of multiple copy printing, and the print job file is sent to the Hot folder of the job manager 502.

Figure 11:
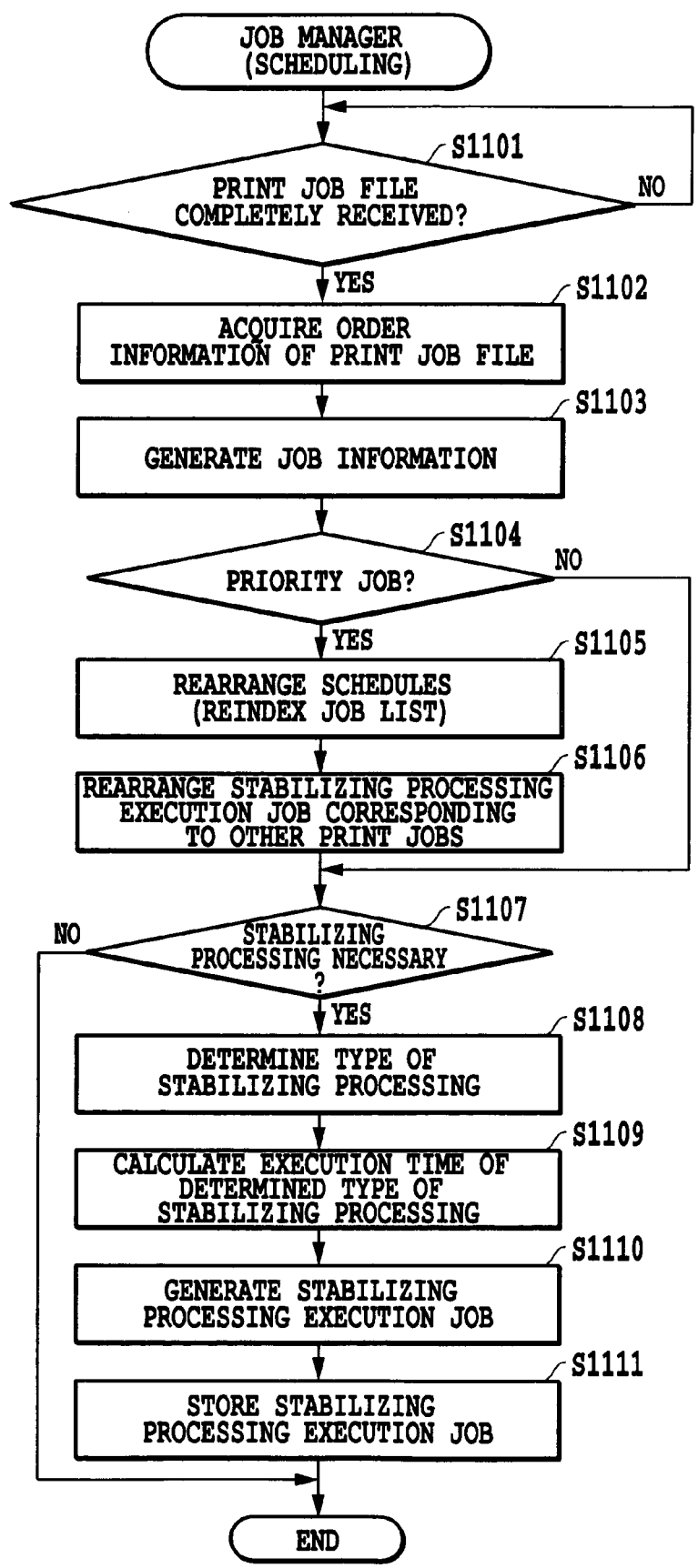
FIG. 11 is a flowchart of job manager scheduling operations according to the one embodiment.

FIG. 11 is a flowchart for scheduling operations of the job manager in FIG. 5. In step S1101, the Hot folder is monitored to determine whether a print job file is provided in the Hot folder by the file output port. In order to determine whether all print job files are received in the Hot folder, the job manager 502 searches for order files which are provided together with those print job files.

Next, in step S1102, print information (setting information of delivery date, the number of copies, output destination, and quality) stored in the order file that is associated with each print job file is acquired. Next in step S1103, job information having a list structures shown in FIG. 13 is generated from the acquired print information. Scheduling is not performed yet at this point, and allocation of each job is not fixed. Therefore, neither PrevAddress nor NextAddress are determined. Next, in step S1104, the delivery time of the print job now scheduled is compared with job information of the last scheduled print job which is already registered in a job list, so as thereby to determine whether the print job now scheduled is a priority job (the delivery time of the print job now scheduled is earlier than that of the last scheduled print job).

Note here that a job to be compared is one of other jobs which are scheduled to be printed from the printer designated as an output destination printer of the print job now scheduled. When the print job now scheduled is a priority job as a result of the comparison, the delivery time thereof is compared sequentially from the last job in the job list in order to determine the order of printing in step S1105. When there is a print job whose order of printing is changed from the original one, the print start time and print end time of this print job are modified.

Next in step S1106, the previously scheduled stabilizing processing execution job is rescheduled. As described above, the stabilizing processing is associated with a print job. Therefore, when there is a print job whose order of printing is changed and which is associated with the stabilizing processing in step S1105, the execution start time and execution end time of the stabilizing processing execution job are modified in the same manner as in the case of a print job. Then, the rescheduling process is completed.

Next in step S1107, determination is made as to whether the print job received in the Hot folder requires the stabilizing processing. This determination is made depending upon whether this print job has attribute information (order information or print settings) necessary for the stabilizing processing. Note here that the order information or print settings necessary for the stabilizing processing are determined in advance. Also, conditions to perform the stabilizing processing can be freely set and modified by an operator or according to operation rules of the print center.

When the print job requires the stabilizing processing, the job manager 502 determines the necessary type of the stabilizing processing in step S1108. In general, there are several types of the stabilizing processing, f or example, processing for stabilizing colors and tones of a printer, and processing for cleaning an image forming unit of the printer. Furthermore, a calibration function for stabilizing tones of a printer offers some processing levels of calibration, such as simple calibration using easy technique and conditions and high-level calibration using advanced technique and conditions. Moreover, processing for cooling down the printer by shutting it down f or a certain period of time is also included.

The job manager 502 holds a stabilizing processing table in which the type of optimal stabilizing processing is determined depending on the attribute information (print settings or order information) of a print job, device characteristics, and printing status. The job manager 502 refers to this table to determine the type of the optimal stabilizing processing. This type of the optimal stabilizing processing may be a combination of the above described various types of stabilizing processing. For example, when the print job is high-quality color printing, the type of the stabilizing processing is determined in advance so that the cleaning processing of the image forming unit and the high-level calibration are executed prior to printing.

Subsequently in step S1109, the job manager 502 determines the time required to execute the stabilizing processing determined in step S1108. The job manager 502 holds information of the time required to execute each of the foregoing types of stabilizing processing. The job manager determines, based on this required time and the type of stabilizing processing to be executed, the printing time required to execute the stabilizing processing. The time required to execute the stabilizing processing is derived from the actual execution time of the stabilizing processing. For example, the simple calibration takes approximately 5 minutes, and the high-level calibration takes approximately 15 minutes. Therefore, the actual execution time of the stabilizing processing is held if it is measurable at the development time of the printer.

For example, when the job manager 502 holds information such that the cleaning processing takes approximately 15 minutes and the high-level calibration takes approximately 15 minutes, the job manager 502 can determine that the time required for the stabilizing processing of the above described print job for high-quality color printing is approximately 30 minutes.

In step S1110, on the basis of the type of the stabilizing processing determined in step S1108 and the time required for the stabilizing processing which is calculated in step S1109, the type of the stabilizing processing is set for the job information, and a stabilizing processing execution job is generated. The stabilizing processing type is used as a control command of the stabilizing processing execution job. The time required for the stabilizing processing is used for the scheduler to display the necessary time for the stabilizing processing execution job. Through these processes, the print job is associated with the stabilizing processing execution job. The job manager 502 holds as a history, in a storage area (not shown), the type and execution time of the stabilizing processing executed in the printer, and the details of the jobs executed in a printer. In accordance with this history information, the job manager 502 determines whether an elapsed time or the cumulative number of output copies exceeds a predetermined time or value in conditions 1 and 2, which will be described later.

The stabilizing processing execution job is a printer control job using a control command of the printer. In step S1111, the generated stabilizing processing execution job is stored in an arbitrary storage area, and is sent to the printer in print thread processing of the job manager 502, which will be described later.

Through the foregoing processing, the job information list managed by job manager 502 is completely created. On the basis of the job information list thus created, the job scheduling screen shown in FIG. 9 is displayed.

The processing operations in steps S1105 and S1106 may be done after the execution time of the stabilizing processing execution job calculated in step S1109 is fixed. In the case where the processing steps in S1105 and S1106 are executed after step S1109, the rearrangement of other print jobs and the stabilizing processing execution job can be made more accurately.

Figure 12:
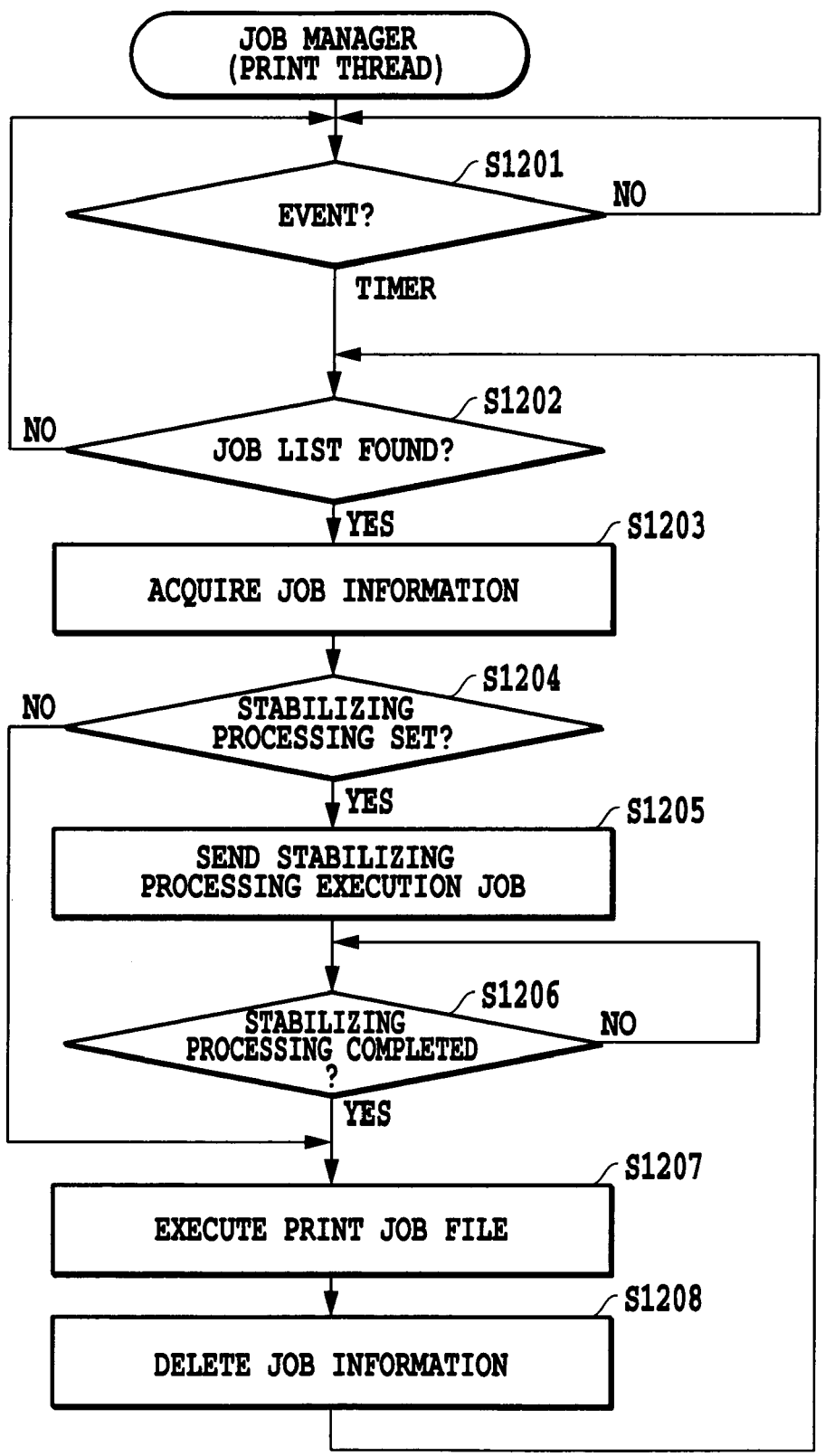
FIG. 12 is a flowchart of processing for a job manger print thread according to the one embodiment of the present invention.

FIG. 12 is a flowchart of the print thread processing in the job manager 502 of FIG. 5. The print thread processing of the job manager is activated by a timer event, and an event is notified at certain time intervals, whereupon the processing is started. Events notified include an end event which is notified when the program of this embodiment is terminated.

In step S1202, determination is made as to whether the notified event is an end event. When the notified event is a timer event as a result of the determination, the job information list generated in the scheduling processing of the job manager is referred to determine whether new job information is added, in step S1202. When there is no new job information, the processing returns to step S1201, and the next event notification is waited. On the other hand, when new job information is added, it is acquired in step S1203. Next, in step S1204, the type of the stabilizing processing that is set in the job information is identified. When the stabilizing processing is not set, the stabilizing processing is determined to be unnecessary. When the stabilizing processing is set, the stabilizing processing execution job is sent to a printer to cause it to execute the stabilizing processing in step S1205. The printer which receives the stabilizing processing execution job interprets the control command of this job, and executes the stabilizing processing described in this control command.

Subsequently, in step S1206, determination is made as to whether the stabilizing processing is completed. When the stabilizing processing in the printer is completed, information indicative of the completion of the stabilizing processing is sent from the printer to the job manager 502. Or alternatively, the job manager 502 may successively acquire the printer's operation status in order to recognize whether the stabilizing processing is completed.

When the job manager 502 recognizes that the stabilizing processing is completed, the print thread processing proceeds to step S1207, in which processing for starting printing of the print job is executed. This processing corresponds to direct print processing for the print job file which is designated by the print job file name set in the job information. Since the print job file is already converted to PDL data by way of a printer driver at the time when sent to the job manager 502, this PDL data may be output to the output port of the printer.

Finally, in step S1208, the corresponding job information is deleted from the job information list, whereupon a series of printing processing steps are completed.

In the foregoing embodiment, the need or non-need of the stabilizing processing is judged whether a print job contains attribute information (order information or print settings) necessary for the stabilizing processing.

However, it is allowable to determine that the stabilizing processing is necessary when at least one of the following conditions is met.

Condition 1: The print job is not subjected to printing processing yet, and the time between the execution time of the last executed stabilizing processing and the print start time of the print job exceeds a predetermined period of time.

Condition 2: The print job is not subjected to printing processing yet, and a predetermined number or more of sheets of paper are printed during the time since the last executed stabilizing processing until the start of printing the print job.

Condition 3: The print job corresponds to attribute information (order information or print settings) necessary for the stabilizing processing.

The purpose of the condition 1 is to execute the stabilizing processing because the printer characteristics once stabilized by the previous stabilizing processing may degraded again due to the elapse of a predetermined time.

The purpose of the condition 2 is to execute the stabilizing processing because the printer characteristics once stabilized by the previous stabilizing processing may be worn or deteriorated resulting from the print output of a certain number or more of sheets of paper. The time interval for the stabilizing processing and the number of sheets of paper output from the printer can be acquired by the job manager 502 which monitors the operating state of the printer.

It is a matter of course that the present invention is achieved by supplying to a system or apparatus a storage medium (or recording medium) having stored a software program code for realizing the functions in the foregoing embodiment, and then causing a computer (or CPU, MPU) of the system or apparatus to read and execute the program code stored in the storage medium.

In this case, the program code itself read from the storage medium implements the foregoing embodiment, and the storage medium having stored this program code constitutes the present invention. Moreover, the functions of the foregoing embodiment can be realized not only by executing the program code read by the computer but also by some or all of actual processing operations executed by an operating system (OS) running on the computer on the basis of an instruction of the program code.

Furthermore, the foregoing embodiment can be realized by some or all of actual processing operations executed by a CPU or the like mounted in a function extension board or function extension unit, which is inserted in or connected to the computer, after the program code read out from the storage medium is written in a storage medium provided in the extension board or unit.

Moreover, it is a matter of course that the present invention is achieved by distributing a software program code for realizing the functions in the foregoing embodiment via a network, then storing this software program code in storage means such as a hard disk or memory of the system or apparatus or in a storage medium such as a CD-RW or CD-R, and causing the computer (or CPU, MPU) of the system or apparatus to read and execute the program code stored in the storage means or storage medium.

As described above, according to the present invention, the type of the stabilizing processing and the necessity of the calibration can be determined in conformity to the characteristic of a print job, and a stabilizing processing execution job can be scheduled between print jobs. Therefore, the job starting and terminating processing of a printer is reduced to the necessary minimum, thereby resulting in improvement in the efficiency of the printer.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

This application claims priority from Japanese Patent Application Nos. 2004-177378 filed Jun. 15, 2004 and 2005-152515 filed May 25, 2005, which are hereby incorporated by reference herein.

What is claimed is:

1. An information processing apparatus for generating a first image forming job including image forming data and attribute information about image formation of the image forming data and sending the generated first image forming job to an image forming device, the apparatus comprising:
   a determining unit for determining what type of stabilizing processing is required, in accordance with the attribute information of the first image forming job;
   a deriving unit for deriving an image forming time required for image formation and an execution time of the stabilizing processing of the type determined by said determining unit, in accordance with the attribute information and the image forming data;
   a generating unit for generating a stabilizing processing execution job of the type determined by said determining unit for causing the image forming device to execute the stabilizing processing, wherein the stabilizing processing execution job is associated with the first image forming job;
   a scheduling unit for deciding a schedule for the first image forming job and the stabilizing processing execution job in accordance with the image forming time and the stabilizing processing execution time; and
   a changing unit for changing the schedule of the first image forming job decided by said scheduling unit
   and also changing the schedule of the stabilizing processing job associated with the first image forming job, when the delivery time of newly generated second image forming job is earlier than the delivery time of the first image forming job in which a schedule is decided by said scheduling unit.

2. The information processing apparatus according to claim 1, wherein the deriving unit stores a plurality of types of the stabilizing processing and execution time of each of the plurality of types of stabilizing processing, and derives the stabilizing processing execution time based on the type of the stabilizing processing determined by the determining unit and the stored stabilizing processing execution time.

3. The information processing apparatus according to claim 1, wherein the stabilizing processing execution job generated by the generating unit is generated as a control job containing a control command for the image forming device.

4. The information processing apparatus according to claim 1, wherein the determining unit determines whether the stabilizing processing is necessary using either one of an elapsed time since the previous stabilizing processing and the number of output sheets of paper used.

5. The information processing apparatus according to claim 1, wherein, the determining unit determines a combination of numerous types of stabilizing processing in accordance with the attribute information of the first image forming job.

6. The information processing apparatus according to claim 1, wherein, the determining unit determines, when the first image forming job is high-quality color printing, the cleaning processing of the image forming unit and the high-level calibration as the type of the stabilizing.

7. An information processing method for generating a first image forming job including image forming data and attribute information about image formation of the image forming data and sending the generated first image forming job to an image forming device, the method comprising:
   performing by a processor the following steps:
   a determining step of determining what type of stabilizing processing is required, in accordance with the attribute information of the first image forming job;
   a deriving step of deriving an image forming time required for image formation and an execution time of the stabilizing processing of the type determined in said determining step, in accordance with the attribute information and the image forming data;
   a generating step of generating a stabilizing processing execution job of the type determined in said determining step for causing the image forming device to execute the stabilizing processing, wherein the stabilizing processing execution job is associated with the first image forming job;
   a scheduling step of deciding a schedule for the first image forming job and the stabilizing processing execution job in accordance with the image forming time and the stabilizing processing execution time; and
   a changing step for changing the schedule of the first image forming job decided by said scheduling unit
   and also changing the schedule of the stabilizing processing job associated with the first image forming job, when delivery time of newly generated second image forming job is earlier than the delivery time of the first image forming job in which a schedule is decided in said scheduling step.

8. The information processing method according to claim 7, wherein, in the deriving step, a plurality of types of the stabilizing processing and execution time of each of the plurality of types of stabilizing processing are stored, and the stabilizing processing execution time is derived based on the type of the stabilizing processing determined in the determining step and the stored stabilizing processing execution time.

9. The information processing method according to claim 7, wherein the stabilizing processing execution job generated in the generating step is generated as a control job containing a control command for the image forming device.

10. The information processing method according to claim 7, wherein the determining step determines whether the stabilizing processing is necessary using either one of an elapsed time since the previous stabilizing processing and the number of output sheets of paper used.

11. The information processing method according to claim 7, wherein, the determining step determines a combination of numerous types of stabilizing processing in accordance with the attribute information of the first image forming job.

12. The information processing method according to claim 7, wherein, the determining step determines, when the first image forming job is high-quality color printing, the cleaning processing of the image forming unit and the high-level calibration as the type of the stabilizing.

13. A computer-readable storage medium storing a computer-executable program for an information processing method of generating a first image forming job including image forming data and attribute information indicating performing of color printing about image formation of the image forming data and sending the generated image forming job to an image forming device, the method comprising:
- a determining step of determining what type of stabilizing processing is required, in accordance with the attribute information of the first image forming job;
- a deriving step of deriving an image forming time required for image formation and an execution time of the stabilizing processing of the type determined in said determining step, in accordance with the attribute information and the image forming data;
- a generating step of generating a stabilizing processing execution job of the type determined in said determining step for causing the image forming device to execute the stabilizing processing, wherein the stabilizing processing execution job is associated with the first image forming job;
- a scheduling step of deciding a schedule for the first image forming job and the stabilizing processing execution job in accordance with the image forming time and the stabilizing processing execution time; and
- a changing step for changing the schedule of the first image forming job decided by said scheduling unit and also changing the schedule of the job associated with the first image forming job, when delivery time of newly generated second image forming job is earlier than the delivery time of the first image forming job in which a schedule is decided in said scheduling step.

* * * * *